(12) United States Patent
Lin et al.

(10) Patent No.: US 9,792,504 B2
(45) Date of Patent: Oct. 17, 2017

(54) MODULARIZED MONITORING APPARATUS

(71) Applicant: BRAINCHILD ELECTRONIC CO., LTD., Taipei (TW)

(72) Inventors: Yi-Ching Lin, Taipei (TW); Shuang-Te Chang, Taipei (TW)

(73) Assignee: BRAINCHILD ELECTRONIC CO., LTD., Taipei (TW)

( * ) Notice: Subject to any disclaimer, the term of this patent is extended or adjusted under 35 U.S.C. 154(b) by 253 days.

(21) Appl. No.: 14/920,594

(22) Filed: Oct. 22, 2015

(65) Prior Publication Data

US 2017/0116482 A1    Apr. 27, 2017

(51) Int. Cl.
*G06K 9/00* (2006.01)
*H04N 5/225* (2006.01)
*H04N 5/232* (2006.01)

(52) U.S. Cl.
CPC ....... *G06K 9/00771* (2013.01); *H04N 5/2252* (2013.01); *H04N 5/2256* (2013.01); *H04N 5/23206* (2013.01); *H04N 5/23216* (2013.01)

(58) Field of Classification Search
CPC ............. G06K 9/00771; H04N 5/2252; H04N 5/2256; H04N 5/23206; H04N 5/23216
USPC ....................................................... 348/146
See application file for complete search history.

(56) References Cited

U.S. PATENT DOCUMENTS

2016/0100086 A1* 4/2016 Chien .................. H04N 5/2256
                                                    348/143
2016/0335501 A1* 11/2016 Huang ............... G06K 9/00771

* cited by examiner

*Primary Examiner* — Jay Patel
*Assistant Examiner* — Marnie Matt
(74) *Attorney, Agent, or Firm* — Chun-Ming Shih; HDLS IPR Services

(57) ABSTRACT

A modularized monitoring apparatus pivotally connected to a supporter includes a photographic module, a lighting module, a communication control module, a power supply module, and a detection module. The photographic module includes a first joint interface. The lighting module includes a second joint interface selectively connected to the first joint interface. The communication control module, the power supply module, and the detection module can be selectively connected to one another, and each includes a third joint interface and a fourth joint interface disposed corresponding thereto. The third joint interface is selectively connected to the first joint interface or the fourth joint interface, and the fourth joint interface is selectively connected to the second joint interface or the third joint interface. The multifunctional modularized monitoring apparatus can rotate and be operated by a smart phone.

13 Claims, 5 Drawing Sheets

MODULARIZED MONITORING APPARATUS

TECHNICAL FIELD

The present invention relates to a modularized monitoring apparatus and, in particular, to a multifunctional modularized monitoring apparatus which is rotatable and can be operated/manipulated or monitor by a smart phone.

BACKGROUND

There has been an increasing demand for monitoring products, and the monitoring products have come into focus in the market. Like computer products, the monitoring products have to meet the trend of network, digitizing, and open infrastructure. Therefore, to meet this trend, there are more and more monitoring products using open network infrastructures which better satisfy a construction demand than closed network infrastructures. Moreover, the traditional wired network has incorporated wireless access, broadband wireless networking, and value added service applications such as motion sensing or automatic prompting. This will change the present security monitoring system.

As more and more value added service applications are incorporated into the security monitoring system, monitoring products with new concepts, new uses, or new techniques are predominant in the market.

Accordingly, an aim of the present invention is to allow a user to construct a product having required functions by using a modular design concept to disassemble or assemble modular modules. Furthermore, an interchanging feature given by the modular design allows the user to change different modules for upgrading or other purposes without the necessity of replacing the whole monitoring system.

SUMMARY

It is an object of the present invention to provide a multifunctional modularized monitoring apparatus which is rotatable and can be operated or monitor by a smart phone.

It is another object of the present invention to provide a modularized monitoring apparatus which can be disassembled and add other suitable modules as required.

Accordingly, the present invention provides a modularized monitoring apparatus pivotally connected to a supporter. The modularized monitoring apparatus includes a photographic module, a lighting module, a communication control module, a power supply module, and a detection module. The photographic module includes a first joint interface. The lighting module includes a second joint interface. The second joint interface is selectively connected to the first joint interface. The communication control module is disposed between the photographic module and the lighting module. The power supply module is selectively connected to the communication control module or the photographic module. The detection module is selectively connected to the power supply module or the lighting module. The communication control module, the power supply module, and the detection module each includes a third joint interface and a fourth joint interface disposed corresponding to the third joint interface. The third joint interface is selectively connected to the first joint interface or the fourth joint interface, and the fourth joint interface is selectively connected to the second joint interface or the third joint interface.

It is preferable that the first joint interface and the fourth joint interface are the same interface, and the second joint interface and the third joint interface are the same interface. The first joint interface and the fourth joint interface are both plugs or sockets, and the second joint interface and the third joint interface are both sockets or plugs.

It is preferable that the modularized monitoring apparatus further includes a first cover, a second cover, and a plurality of boxes connected to one another, wherein one or all of the first joint interface, the second joint interface, the third joint interface, and the fourth joint interface correspondingly protrude out of the first cover, the second cover, or each of boxes, or are correspondingly disposed inside the first cover, the second cover, or each of the boxes.

It is preferable that the first cover covers the photographic module, the second cover covers the lighting module, and the boxes respectively cover the communication control module, the power supply module, and the detection module.

It is preferable that the first cover and the second cover are symmetrical in shape and consist of a transparent material, the first cover and the second cover are semicircular or rectangular, and each of the boxes is circular disk-shaped or rectangular.

It is preferable that the modularized monitoring apparatus further comprises a plurality of hook portions and a plurality of engagement portions engaged with the hook portions respectively, wherein the hook portions are respectively disposed at a side edge of the first cover and a side edge of each of the boxes, and each of the engagement portions are disposed at a side edge of the second cover and the other side edge of each of the boxes.

BRIEF DESCRIPTION OF THE DRAWINGS

The disclosure will become more fully understood from the detailed description and the drawings given herein below for illustration only, and thus does not limit the disclosure, wherein.

DETAILED DESCRIPTION

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Figure 1:
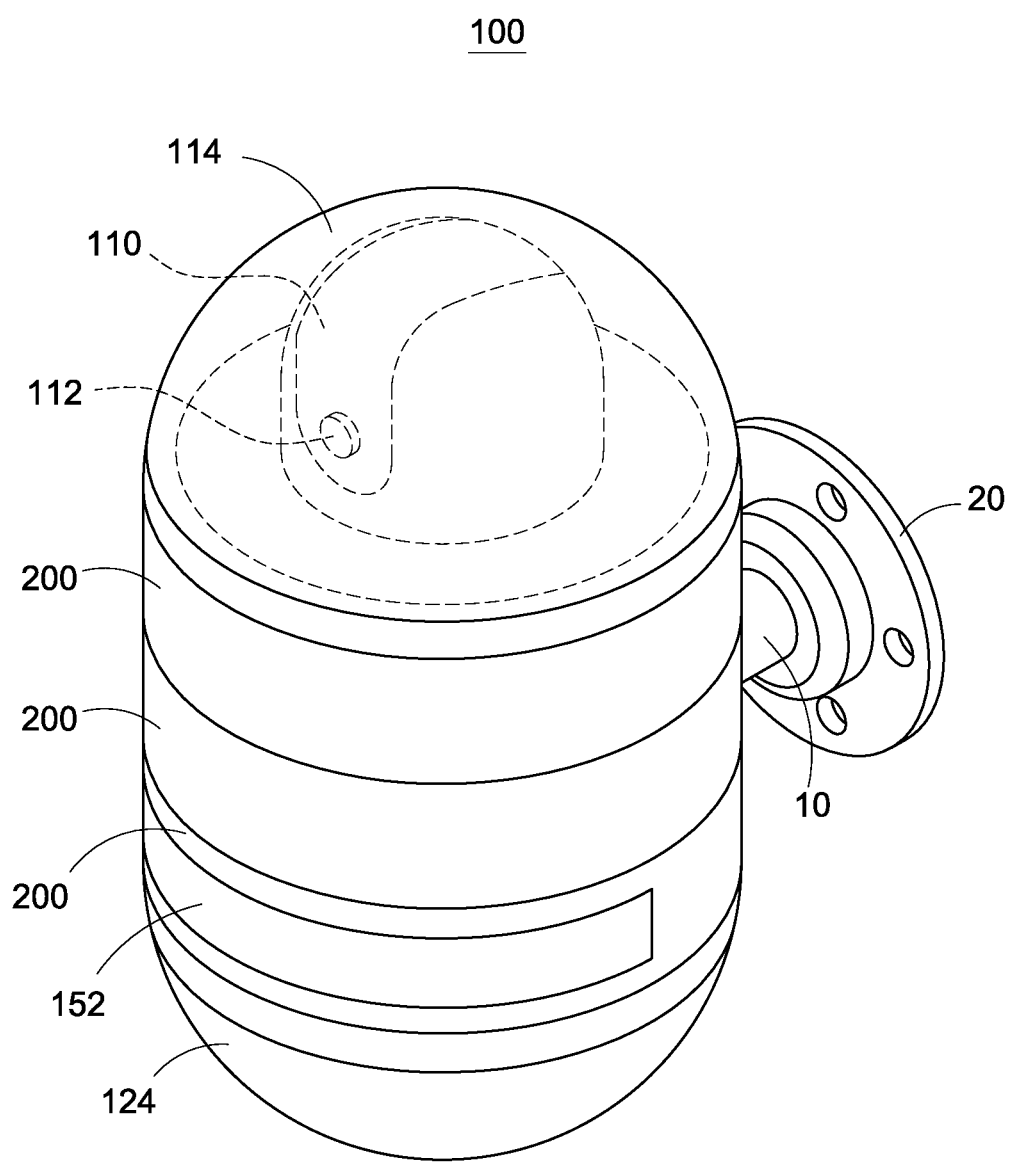
FIG. 1 is a perspective view according to a first embodiment of the present invention.
Figure 2:
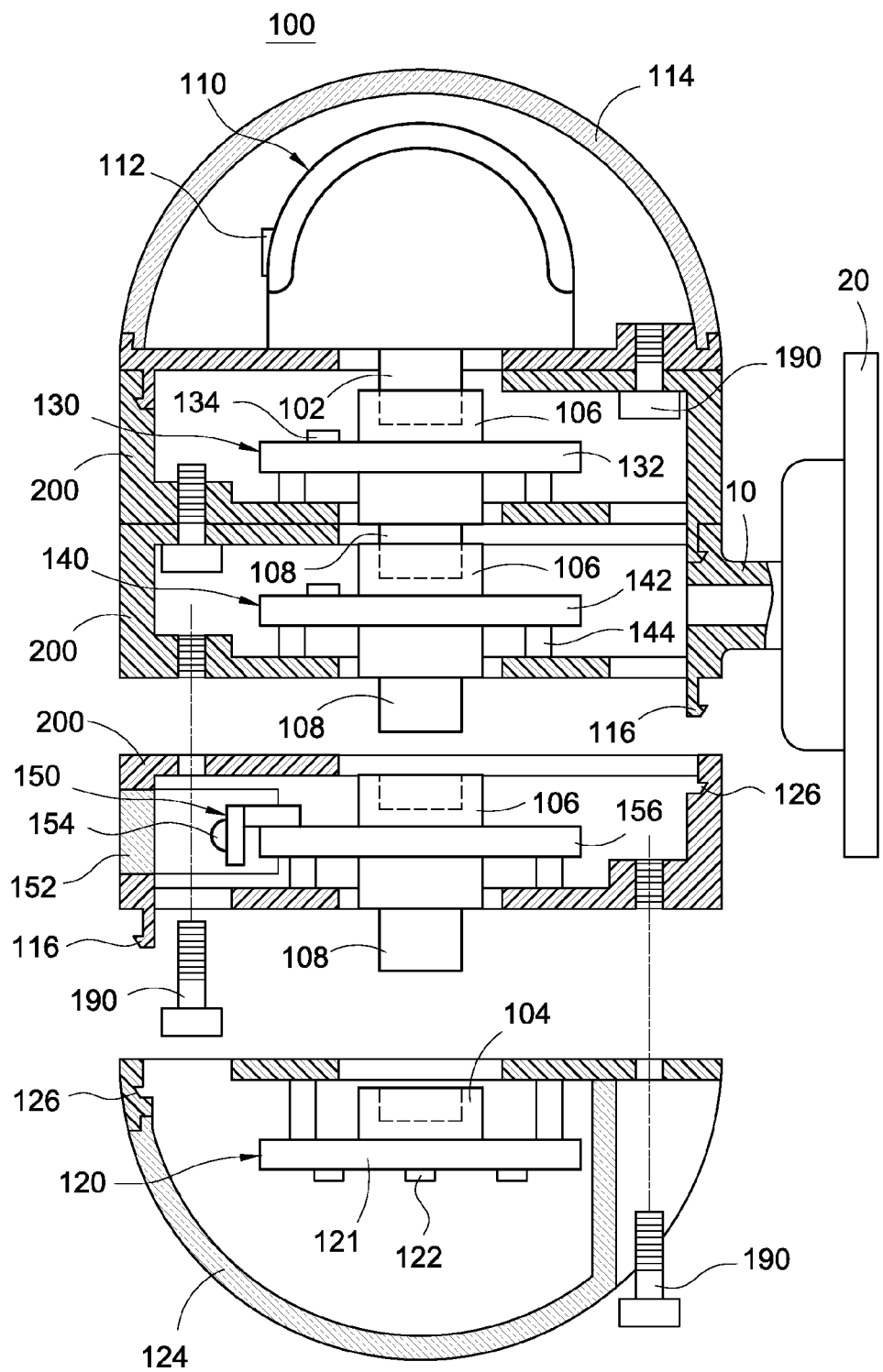
FIG. 2 is a partial exploded cross-sectional view according to the first embodiment of the present invention.
Figure 3:
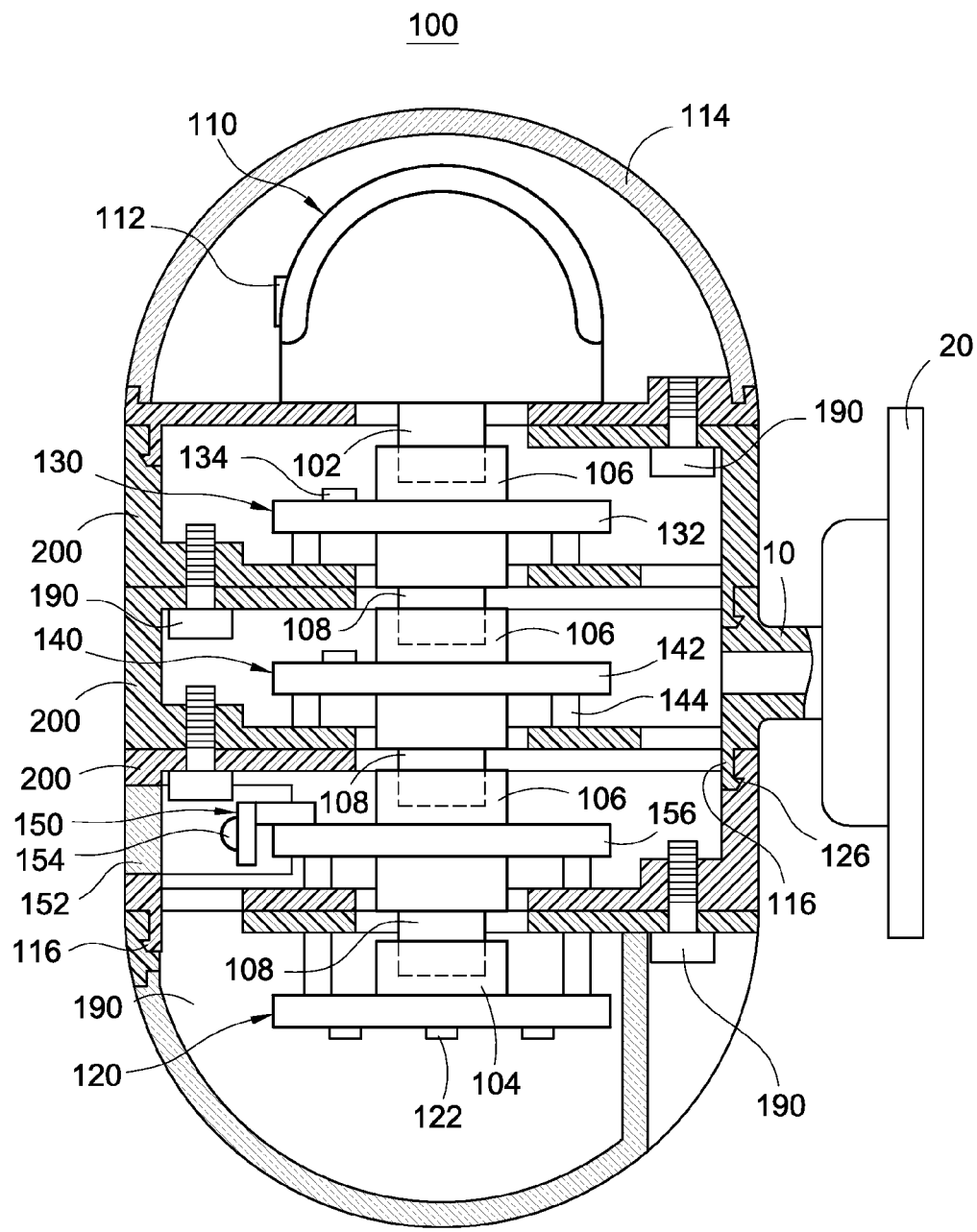
FIG. 3 is a cross-sectional view showing a modularized monitoring apparatus with parts assembled together according to the first embodiment of the present invention.

Referring to FIGS. 1 to 3, the present invention provides a modularized monitoring apparatus 100 pivotally connected to a supporter 10. In the present embodiment, the supporter 10 is fixed on a base 20. The base 20 can be fixed in any desired environment or location, and the present invention is not limited in this regard. The modularized monitoring apparatus 100 of the present invention is rotatable with respect to the base 20 by means of the supporter 10, and rotation can be achieved manually, automatically, or in other suitable ways. However, in the present embodiment, it is preferable to manually rotate the modularized monitoring apparatus 100 by any angle, such as 360 degrees or above, so as to provide ideal lighting or a required monitoring effect on the surroundings.

As shown in the drawings, the modularized monitoring apparatus 100 includes a photographic module 110, a lighting module 120, a communication control module 130, a power supply module 140, and a detection module 150. The photographic module 110 includes a first joint interface 102. The lighting module 120 includes a second joint interface 104, and the second joint interface 104 is selectively connected to the first joint interface 102. The communication control module 130 is disposed between the photographic module 110 and the lighting module 120. The power supply module 140 is selectively connected to the communication control module 130 or the photographic module 110.

The detection module 150 is selectively connected to the power supply module 140 or the lighting module 120. The communication control module 130, the power supply module 140, and the detection module 150 each includes a third joint interface 106 and a fourth joint interface 108 disposed corresponding to the third joint interface 106, the third joint interface 106 is selectively connected to the first joint interface 102 or the fourth joint interface 108, and the fourth joint interface 108 is selectively connected to the second joint interface 104 or the third joint interface 106.

The first joint interface 102 and the fourth joint interface 108 are the same interface, and the second joint interface 104 and the third joint interface 106 are the same interface. That is to say, the first joint interface 102 and the fourth joint interface 108 are each preferably a plug, such as a USB plug, an IEEE plug or other suitable plug for connection; the second joint interface 104 and the third joint interface 106 are each preferably a socket, such as a USB socket, an IEEE socket, or other suitable socket for connection. However, in other different embodiment, the first joint interface 102 and the fourth joint interface 108 can also be sockets; the second joint interface 104 and the third joint interface 106 are plugs, and the joint interfaces are not limited to any particular type of interface.

Furthermore, in the present embodiment, the present invention further includes a first cover 114, a second cover 124, and a plurality of boxes 200 connected to one another to form a capsule shape. As shown in FIGS. 2 and 3, the first cover 114 covers the photographic module 110, and the second cover 124 covers the lighting module 120. The first cover 114 and the second cover 124 are symmetrical in shape such as semicircular, rectangular, or of other suitable shape. The first cover 114 and the second cover 124 consist of a transparent material for photographic or lighting purposes.

One or all of the first joint interface 102, the second joint interface 104, the third joint interface 106, and the fourth joint interface 108 correspondingly protrude out of the first cover 114, the second cover 124, or each of boxes 200, or are correspondingly disposed inside the first cover 114, the second cover 124, or each of the boxes 200. In a preferable embodiment, the first joint interface 102 and the fourth joint interface 108, each being a socket for example, are movably connected to a corresponding one of the modules; the present invention is not limited in this regard. The second joint interface 104 and the third joint interface 106, each being a socket, are preferably correspondingly disposed inside the first cover 114, the second cover 124, or each of the boxes 200.

The boxes 200 respectively cover the communication control module 130, the power supply module 140, and the detection module 150. The boxes 200 are detachably coupled to the modules by means of the third joint interface 106 and the fourth joint interface 108. As shown in the drawings, each of the boxes 200 is circular disk-shaped, rectangular, or of other suitable shape to be connected to the first cover 114 and the second cover 124 correspondingly. When the first cover 114, the second cover 124, and the boxes 200 are assembled together, the modules therein are prevented from being damaged by rain, water, dust, or other elements.

The modules are described in brief as follows. The photographic module 110 includes a lens 112 for photographing or video recording. The first joint interface 102 protrudes outside of the first cover 114 and is movably or immovably connected to the photographic module 110. The lighting module 120 includes a plurality of light emitting elements 122 disposed on a circuit board 121. The second joint interface 104 is disposed on the other side of the circuit board 121 opposite to the light emitting elements 122. The light emitting element 122 is preferably a light emitting diode (LED) lamp. The communication control module 130 includes a circuit board 132 disposed with at least one chip 134. The chip 134 preferably includes a built-in wireless communication control interface and incorporates a network communication feature, thereby allows operation/manipulation by a smart phone or a computer. Since the communication control module 130 is a conventional technique, descriptions thereof are not repeated herein for brevity.

The power supply module 140 includes a circuit board 142 having an ordinary battery, a rechargeable battery 144, or other suitable battery, so as to provide power to respective ones of the modules and rectify, transform, or output voltages. Power can be transmitted or charged via the third joint interface 106, the fourth joint interface 108, the first joint interface 102, or the second joint interface 104 coupled to one another. Certainly, each module can also include a built-in replaceable battery for independent operation of each module. The supporter 10 is connected to the box 200 of the power supply module 140. However, in other embodiments, the supporter 10 can also be detachably connected to the box 200 of any module.

The detection module 150 includes a circuit board 156 disposed with a sensor 154. The sensor 154 is preferably an infrared motion sensor (PIR motion sensor) or a human motion sensor to detect motion of an object. Furthermore, the box 200 of the detection module 150 further includes a transparent window 152 to allow the sensor 154 to detect. When the detector 154 detects a person passing by, the light emitting element 122 of the lighting module 120 is turned on to illuminate. At this point, the photographic module 110 can photograph or perform video recording, and the photographed or recorded data can be reproduced or used through the internet or a cellular phone. However, sequences or steps in using the modules can vary depend on requirements or different situations.

Figure 4:
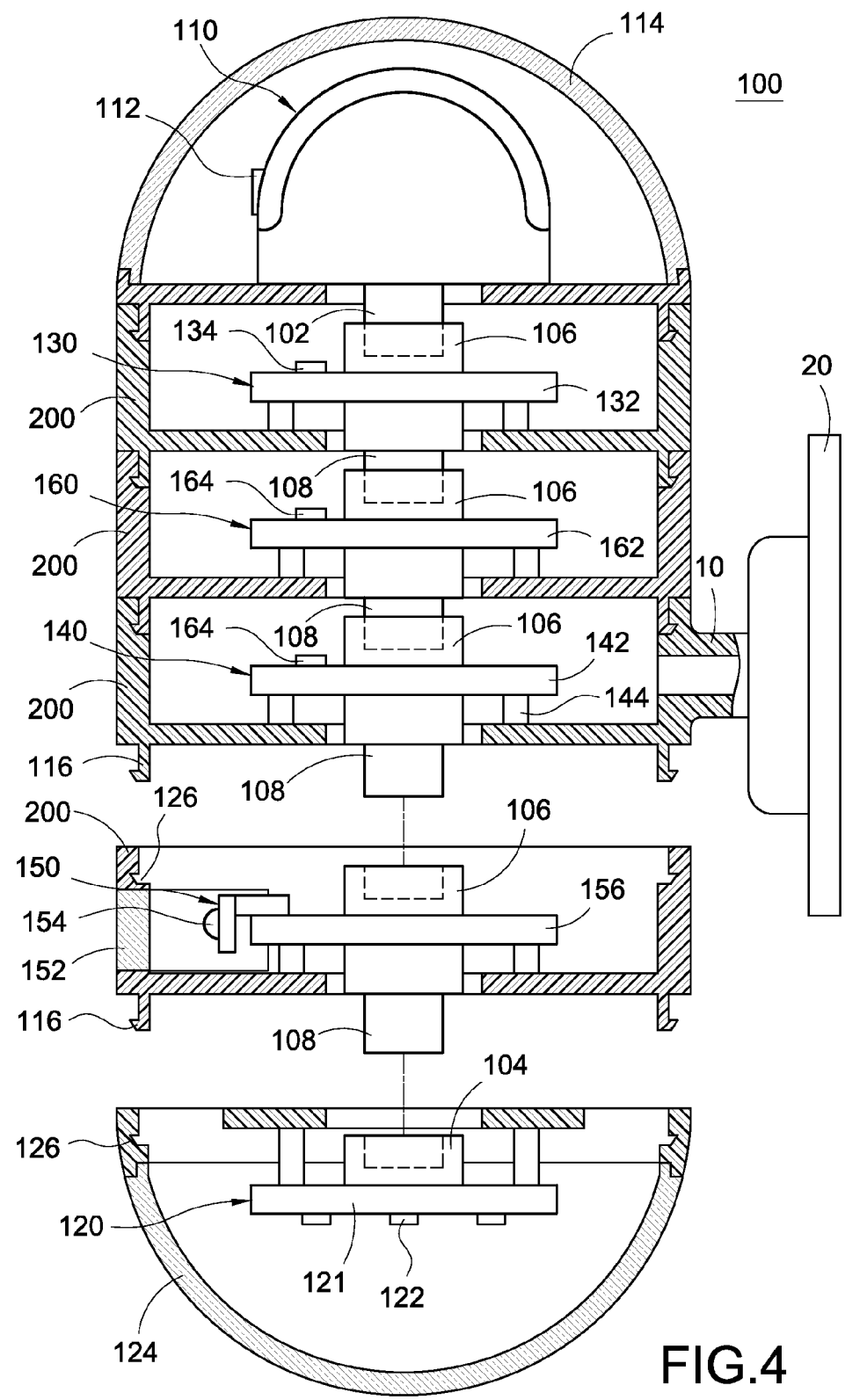
FIG. 4 is a partial exploded cross-sectional view according to a second embodiment of the present invention.

In the embodiment shown in FIGS. 1 and 3, the modularized monitoring apparatus 100 further comprises a plurality of hook portions 116 and a plurality of engagement portions 126 engaged with the hook portions 116 respectively, wherein the hook portions 116 are respectively disposed at a side edge of the first cover 114 and a side edge of each of the boxes 200, and each of the engagement portions 126 are respectively disposed at a side edge of the second cover 124 and the other side edge of each of the boxes 200, so that the first cover 114, the second cover 124, and each of the boxes 200 can be assembled together. Furthermore, in the present embodiment, the modularized monitoring apparatus 100 further includes a plurality of fastening elements 190 such as bolts or screws. Each of the fastening elements 190 fastens together any two adjacent boxes 200, fastens together the first cover 114 and the box 200, or fastens together the box 200 and the second cover 124, thereby achieving connection relationship therebetween. However, in the embodiment shown in FIG. 4, the connection relationship can be achieved by utilizing the hook portions 116 and the engagement portions 126 corresponding thereto, wherein the hook portions 116 and the engagement portions 126 are disposed on the first cover 114, the second cover 124, and each of the boxes 200.

In the present embodiment, the modularized monitoring apparatus 100 includes an environmental detection module 160, a storage module (not illustrated), or other suitable module. The environmental detection module 160 is disposed in the box 200, and is also disposed with the third joint interface 106 and the fourth joint interface 108 for detecting the ambient temperature and humidity. According to the present embodiment, the environmental detection module 160 is preferably connected between the communication control module 130 and the power supply module 140. However, in other different embodiments, the environmental detection module 160 can also be disposed between the photographic module 110 and the lighting module 120 and can be selectively connected to any module/box 200. The storage module (not illustrated) includes a removable flash memory card, a solid state drive, or other hot swappable storage device.

Figure 5:
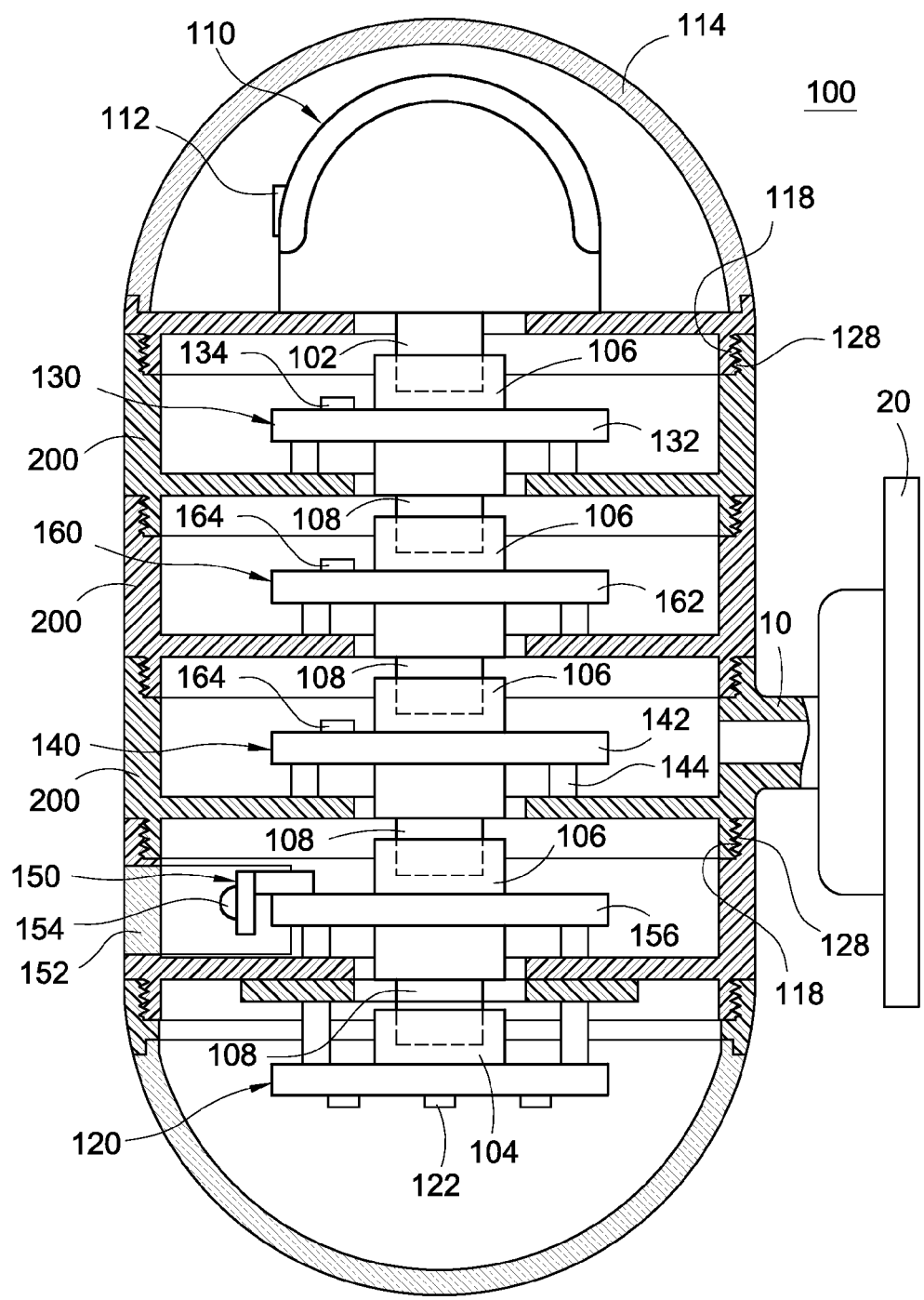
FIG. 5 is a cross-sectional view showing the modularized monitoring apparatus with parts assembled together according to a third embodiment of the present invention.

As shown in FIG. 5, the modularized monitoring apparatus 100 further includes a plurality of coupling portions 118 and a plurality of coupled portions 128, wherein the coupling portions 118 are respectively disposed at a side edge of the first cover 114 and a side edge of each of the boxes 200, and the coupled portions 128 are respectively disposed at a side edge of the second cover 124 and the other side edge of each of the boxes 200. The coupling portion 118 and the coupled portion 128 are preferably an outer threaded structure and an inner threaded structure, so that the first cover 114, the second cover 124, and each of the boxes 200 can be connected to one another.

The modularized monitoring apparatus 100 is rotatable manually or automatically by means of the supporter 10, and can be operated or monitor by a smart phone (not illustrated). The feature that the boxes 200 can be assembled or disassembled enables other module to be incorporated into the modularized monitoring apparatus as required.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A modularized monitoring apparatus, pivotally connected to a supporter, comprising:
   a photographic module including a first joint interface;
   a lighting module including a second joint interface, the second joint interface being selectively connected to the first joint interface;
   a communication control module disposed between the photographic module and the lighting module;
   a power supply module selectively connected to the communication control module or the photographic module; and
   a detection module selectively connected to the power supply module or the lighting module, wherein the communication control module, the power supply module, and the detection module each includes a third joint interface and a fourth joint interface disposed correspondingly to the third joint interface, the third joint interface is selectively connected to the first joint interface or the fourth joint interface, and the fourth joint interface is selectively connected to the second joint interface or the third joint interface.

2. The modularized monitoring apparatus of claim 1, wherein the first joint interface and the fourth joint interface are the same interface, and the second joint interface and the third joint interface are the same interface.

3. The modularized monitoring apparatus of claim 2, wherein the first joint interface and the fourth joint interface are both plugs or sockets, and the second joint interface and the third joint interface are both sockets or plugs.

4. The modularized monitoring apparatus of claim 1, wherein the first joint interface and the fourth joint interface are both plugs or sockets, and the second joint interface and the third joint interface are both sockets or plugs.

5. The modularized monitoring apparatus of claim 1, further comprising a first cover, a second cover, and a plurality of boxes connected to one another, wherein one or all of the first joint interface, the second joint interface, the third joint interface, and the fourth joint interface correspondingly protrude out of the first cover, the second cover, or each of boxes, or are correspondingly disposed inside the first cover, the second cover, or each of the boxes.

6. The modularized monitoring apparatus of claim 5, wherein the first cover covers the photographic module, the second cover covers the lighting module, and the boxes respectively cover the communication control module, the power supply module, and the detection module.

7. The modularized monitoring apparatus of claim 5, wherein the first cover and the second cover are symmetrical in shape and consist of a transparent material, the first cover and the second cover are semicircular or rectangular, and each of the boxes is circular disk-shaped or rectangular.

8. The modularized monitoring apparatus of claim 5, further comprising a plurality of hook portions and a plurality of engagement portions engaged with the hook portions respectively, wherein the hook portions are respectively disposed at a side edge of the first cover and a side edge of each of the boxes, and each of the engagement portions are disposed at a side edge of the second cover and the other side edge of each of the boxes.

9. The modularized monitoring apparatus of claim 5, further comprising a plurality of fastening elements, each of the fastening elements fastening together any two adjacent boxes, fastening together the first cover and the box, or fastening together the box and the second cover.

10. The modularized monitoring apparatus of claim 5, further comprising a plurality of coupling portions and a plurality of coupled portions, wherein the coupling portions are respectively disposed at a side edge of the first cover and a side edge of each of the boxes, and the coupled portions are respectively disposed at a side edge of the second cover and the other side edge of each of the boxes.

11. The modularized monitoring apparatus of claim 5, further comprising an environmental detection module or a storage module, the environmental detection module and the storage module are respectively disposed in the boxes.

12. The modularized monitoring apparatus of claim 11, wherein the environmental detection module detects temperature or humidity, and the storage module includes a removable flash memory card or a solid state drive which is built into the storage module.

13. The modularized monitoring apparatus of claim 1, wherein the detection module is an infrared motion sensor or a human motion sensor.

\* \* \* \* \*